United States Patent [19]

Sugiyama et al.

[11] Patent Number: 5,420,846
[45] Date of Patent: May 30, 1995

[54] RECORDING MEDIUM HAVING A PLURALITY OF NONLINEAR TRANSMISSION CHARACTERISTICS

[75] Inventors: Hisataka Sugiyama; Akira Arimoto, both of Kodaira; Motoyasu Terao, Tokyo; Norio Murase, Kokubunji; Kimio Tatsuno; Masahiko Takahashi, both of Kodaira; Fumiyoshi Kirino, Tokyo; Fumio Kugiya, Hachioji, all of Japan

[73] Assignee: Hitachi, Ltd., Tokyo, Japan

[21] Appl. No.: 21,907

[22] Filed: Feb. 23, 1993

Related U.S. Application Data

[63] Continuation-in-part of Ser. No. 922,375, Jul. 31, 1992, Pat. No. 5,315,573.

[30] Foreign Application Priority Data

| Aug. 8, 1991 | [JP] | Japan | 3-199084 |
| Nov. 5, 1991 | [JP] | Japan | 3-288496 |
| Feb. 26, 1992 | [JP] | Japan | 4-039363 |
| Mar. 13, 1992 | [JP] | Japan | 4-054762 |

[51] Int. Cl.$^6$ ............................ G11B 7/00; G11B 15/87
[52] U.S. Cl. ........................... 369/100; 369/13; 369/288; 369/283; 369/275.2; 430/502; 430/270
[58] Field of Search ............... 369/109, 100, 275.2, 369/118, 116, 110, 288, 13, 283; 365/122; 360/59; 430/502, 270

[56] References Cited

U.S. PATENT DOCUMENTS

| 4,316,279 | 2/1982 | Russell et al. | 369/109 |
| 5,153,873 | 10/1992 | Spruit et al. | 369/275.2 |
| 5,293,567 | 3/1994 | Terao et al. | 369/288 |
| 5,315,573 | 5/1994 | Nakao et al. | 369/100 |
| 5,315,577 | 5/1994 | Kirino et al. | 369/116 |

OTHER PUBLICATIONS

Technical Digest of Optical Data Storage, Feb. 1991, vol. 1499, pp. 209–215, Lecture No. TUB-3.
Technical Digest of Optical Data Storage, Feb. 1991, vol. 1499, pp. 216–225, lecture No. TUB-4.
N. Peyghambarian et al, "Physical Review Letters, vol. 51", Oct., 1983, pp. 1692–1695.

*Primary Examiner*—Georgia Y. Epps
*Assistant Examiner*—Kim-Kwok Chu
*Attorney, Agent, or Firm*—Fay, Sharpe, Beall, Fagan, Minnich & McKee

[57] ABSTRACT

An information recording medium includes an information recording layer on which at least information is to be recorded by irradiating light, and a light transmission restricting layer which has a plurality of nonlinear transmission characteristics or nonlinear reflection characteristics for the intensity of the light irradiated and which has an optical material for restricting the transmission or reflection of the light according to the respective characteristics when the light is irradiated onto the information recording layer. An information recording and reproducing unit uses the information recording medium and includes an information recording position setting unit for deciding a position at which information is to be recorded on the information recording medium by detecting a direction of an easy magnetization axis. With the above arrangement, the spot diameter of the light can be distinguished between the one when information is reproduced and the one when information is recorded on the information recording medium respectively, to thereby ensure an accurate positioning of the head on the tracks of the recording medium.

21 Claims, 10 Drawing Sheets

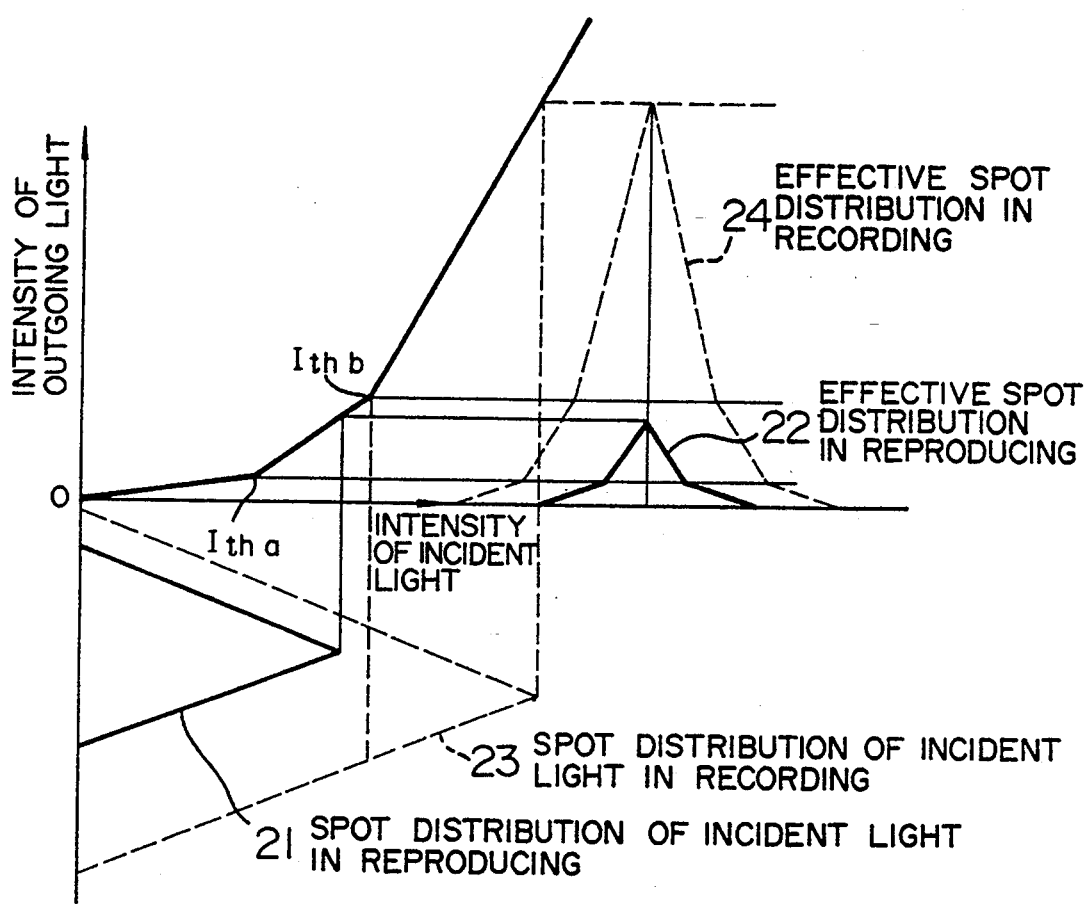

RECORDING MEDIUM HAVING A PLURALITY OF NONLINEAR TRANSMISSION CHARACTERISTICS

CROSS-REFERENCE TO RELATED APPLICATION

The present application is a continuation-in-part of U.S. application Ser. No. 07/922,375 filed on Jul. 31, 1992, now U.S. Pat. No. 5,315,573, issued on May 24, 1994, entitled "Optical Disk Recording and Reproducing Wavelengths using a Saturable Absorber" by Hisataka SUGIYAMA et al and assigned to the present assignee, the contents of which are incorporated herein by reference.

BACKGROUND OF THE INVENTION

The present invention relates to an information recording medium such as an optical disk or the like, an information recording and reproducing unit for using the information recording medium and a method for deciding a position of information when the information is to be recorded on the information recording medium.

As conventional techniques for reproducing fine signals of the size of at most a resolution limit in an optical disk unit and others, there are those techniques which are described in the Technical Digest of Optical Data Storage, 1991, Volume 1499, on pages 209 to 215 in the lecture number TUB-3 and on pages 216 to 225 in the lecture number TUB-4, for example. The feature of these techniques is that they use optical magnetic recording films of a plurality of layers in which layers for "masking" surrounding information are provided in addition to an information recording layer. Information (bits) recorded on the information recording layer appears at a portion where the temperature has risen by an irradiation of a reproduced light. Therefore, interference between adjacent bits is restricted even if the recording density has been increased, to thereby improve optical resolution.

According to the above-described prior art techniques, however, the information recording medium has been limited to an optical magnetic disk. Further, information which appeared on the "masking" layers remains even after reproducing spots have passed there. Accordingly, although it is possible to restrict the influence of bits before they are reproduced, the influence of the bits after they have been reproduced still remains within the adjacent bits. Furthermore, when information is recorded, a stronger beam is irradiated than when information is reproduced, so that it is not possible to efficiently record fine information bits.

SUMMARY OF THE INVENTION

It is an object of the present invention to provide an information recording medium with high recording density by improving the optical resolution at the time information is recorded.

It is another object of the present invention to provide an information recording and reproducing unit with improved performance of recording and reproducing information, by using the above-described information recording medium and setting a recording position for recording the information on this information recording medium and a recording position for reproducing the information recorded on this information recording medium.

It is still another object of the present invention to provide a method for deciding a position at which information is to be recorded, which makes it possible to accurately decide a position of information on recording tracks of the information recording medium when the information is recorded on the tracks, by initializing the tracks so that the easy magnetization axis faces a perpendicular direction or a parallel direction with respect to the plane of the information recording medium.

The first feature of the present invention is an information recording medium which includes an information recording layer on which at least information is to be recorded by irradiating a light, and a light transmission restricting layer which has a plurality of nonlinear transmission characteristics for the intensity of the light irradiated and which has an optical material for restricting the transmission of the light according to the respective nonlinear transmission characteristics when the light is irradiated onto the information recording layer. In this case, the optical material held by the light transmission restricting layer may be a combination of a plurality of optical media that have a plurality of nonlinear transmission characteristics determined at specific threshold values for the intensity of the light irradiated. Further, the optical material held by the light transmission restricting layer may be a material which is provided by mixing a plurality of organic media having respectively specific saturable absorption characteristics for the light into a medium and a binder of the same characteristics as those of these organic media. Further, the light transmission restricting layer may have an optical element layer for shielding the transmission of the radiation beam generated from the optical material.

Further, the information recording medium may include an information recording layer on which at least information is recorded by irradiating a light, and a light transmission restricting layer that has a plurality of nonlinear reflection characteristics for the intensity of the light irradiated and have an optical material for restricting the quantity of the light reflected from the information recording medium in accordance with the intensity of the light. In this case, the optical material held by the light transmission restricting layer may be the combination of a plurality of optical media that have a plurality of nonlinear reflection characteristics determined at specific threshold values for the intensity of the light irradiated. Further, the optical material held by the light transmission restricting layer generates a coherent superposition of an incident wave and a reflected wave of the light irradiated.

As explained above, it is possible to distinguish between an absorption threshold value of the light for a strong beam irradiated at the time of recording information and an absorption threshold value of the light for a weak beam irradiated at the time of reproducing the information, by providing the information recording medium with a plurality of nonlinear transmission characteristics or a plurality of nonlinear reflection characteristics for the intensity of the light irradiated onto the information recording medium or by shielding the transmission of a radiation beam generated from the optical material by providing an optical element layer in the information recording medium. Accordingly, it is possible to keep the spot diameter of the light at the time of recording to be smaller than the resolution of the optical system, to thereby improve the information recording density.

The second feature of the present invention is that the information recording and reproducing unit which includes a light source, an information recording medium including an information recording layer for recording at least information by a light transmitted from the light source and a light transmission restricting layer having an optical material for restricting the beam irradiated onto the information recording layer, a focusing optical system for stopping the light to be irradiated onto the information recording medium, a reproducing optical system for reading information recorded on the information recording medium by the focusing optical system according to the light of which input to the information recording medium has been restricted, and an information recording position setting unit for deciding a position at which the information is to be recorded on the information recording medium.

The information recording medium has a plurality of nonlinear transmission characteristics for the intensity of the light or a plurality of nonlinear reflection characteristics for the intensity of the light, as described above. The information recording and reproducing unit may have an optical element material for shielding the radiation beam generated from the information recording medium at the light incident side of the reproducing optical system and the focusing optical system respectively.

The information recording position setting unit includes a light spot deviation signal detecting optical system for detecting a light spot deviation signal which shows a deviation of a light spot from a predetermined information recording position for reproducing the information on the information recording medium. The information recording position setting unit includes a first unit for forming the easy magnetization axis of the tracks on the information recording medium in at least one of the perpendicular direction and the parallel direction with respect to the plane of the information recording medium, a second unit for detecting at least one of the perpendicular direction and the parallel direction of the easy magnetization axis of the tracks on the information recording medium, and a third unit for recording information in at least one of the perpendicular direction and the parallel direction of the detected easy magnetization axis.

With the above-described structure of the information recording and reproducing unit, information is recorded on the information recording medium by irradiating a beam determined by a threshold value of a strong beam, or information is reproduced by irradiating a beam determined by a threshold value of a weak beam, a radiation beam generated from the information recording medium is shielded by an optical element material, and a position of information to be recorded can be decided. Thus, this structure makes it possible to improve the recording and reproducing of information.

The third feature of the present invention is the position deciding method for deciding a position at which information is to be recorded on the information recording medium. According to this method, the tracks of the information recording medium are first initialized so that the tracks have easy magnetization axes in at least one of the perpendicular direction and the parallel direction with respect to the plane of the information recording medium. Then, of the tracks on the information recording medium which have been first initialized, a detection is made of at least one of the perpendicular direction and the parallel direction of the magnetization axes of the tracks with respect to the plane of the information recording medium.

A second initialization is made of the tracks of at least one of the perpendicular direction and the parallel direction by sector to record control information on them, and data are recorded on the data recording portion according to control information of the sector. The detection of the direction of the easy magnetization axis is carried out by detecting a perpendicular magnetic anisotropy of the information recording medium.

Erasing and recording of information is carried out as follows. Information is erased by irradiating a light at the portion where the easy magnetization axis is perpendicular with respect to the plane of the information recording medium, and information is recorded by irradiating a light at the portion of the perpendicular direction of the easy magnetization axis.

In reproducing information, the information is reproduced according to the Kerr or Faraday effect obtained at the time when a light has been irradiated at the portion of the perpendicular direction of the easy magnetization axis. The direction of the easy magnetization axis may be detected based on presence or absence of the Kerr or Faraday effect in the border area between the portion of the perpendicular direction and the portion of the parallel direction of the easy magnetization axis when the light has been irradiated onto the information recording medium.

The first initialization is carried out by irradiating a light to whole tracks of the information recording medium so that the easy magnetization axis adopts a perpendicular direction with respect to the plane of the information recording medium and then irradiating a light to every two tracks so that the easy magnetization axis takes a parallel direction with respect to the plane of the information recording medium based on changes of the magnetic characteristics of the information recording medium. When the easy magnetization axis is to be set in the parallel direction, it changes the perpendicular magnetic anisotropic energy held by the portion of the perpendicular direction to provide a change of the Kerr or Faraday effect.

Based on the above-described method for deciding a position for recording information, it is possible to record control information at an accurate position when sectors are to be allocated to the tracks on the information recording medium, or when the tracks are to be initialized, so that positions at which data are to be recorded on the tracks can be made accurate and errors in reading the data at the time of reproducing the data can be eliminated.

BRIEF DESCRIPTION OF THE DRAWINGS

FIG. 2 is a graph for showing one example of the nonlinear optical transmission characteristics of the optical material;

DESCRIPTION OF THE PREFERRED EMBODIMENT

Embodiments of the present invention will be explained below with reference to the drawings.

Figure 1:
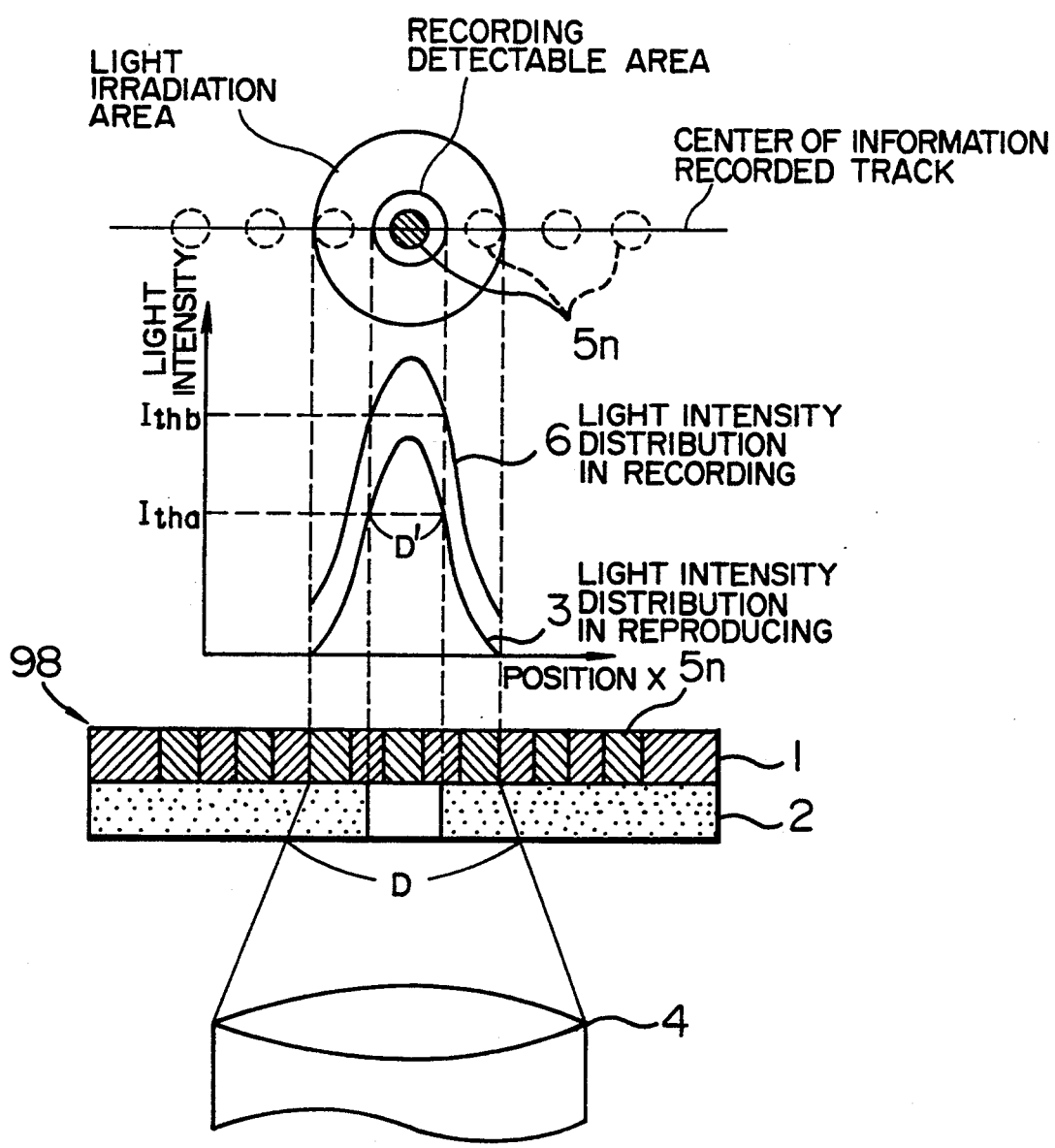
FIG. 1 is an explanatory diagram for showing one example of the information recording medium according to the present invention.

FIG. 1 is a diagram for explaining one embodiment of the structure of the information recording medium according to the present invention.

An information recording medium 98 of the present embodiment has a saturable absorber 2 which is one of the absorption types of the nonlinear optical material, an information recording layer 1 and a protection layer not shown laminated on a disk substrate which is not shown in the diagram. A luminous flux from a light source is focussed on the information recording layer 1 by a focussing lens 4 through the saturable absorber 2 from the disk substrate side. Information bits 5n are recorded on the information recording layer 1 along the center of the information recording track.

In the information recording medium 98 of the present embodiment, the saturable absorber 2 has two nonlinear optical transmission characteristics corresponding to the intensity of an irradiated beam. With this arrangement, when a luminous flux has been focussed on the information recording layer 1 through the saturable absorber 2, the optical intensity distribution of the information recording layer 1 and its surrounding is divided into two.

When information is to be reproduced at the time when a low intensity light is being irradiated onto the disk, that is the information recording medium 98, a light component of the area with an optical intensity of at least a predetermined value $I_{tha}$ is transmitted through the saturable absorber 2 based on an optical intensity distribution 3 at the time of the reproduction. Thus, an effective optical spot diameter is reduced from D to D' and a detectable area is generated at the center of the light irradiated portion. This makes it possible to detect information bits in only the detectable area of the information recording layer 1.

When information is to be recorded at the time when a high intensity light is being irradiated, a light component of the area with an optical intensity of at least a predetermined value $I_{thb}$ is transmitted through the saturable absorber 2 based on an optical intensity distribution 6 at the time of the recording. Thus, an effective optical spot diameter is produced and a recordable area is generated at the center of the light irradiated portion. This makes it possible to record information bits in only this portion of the information recording layer 1.

In the manner as described above, according to the information recording medium 98 of the present embodiment, it is possible to efficiently record fine information bits.

The saturable absorber 2 is an absorption-type nonlinear optical transmission medium, and has such characteristics that when the intensity of an irradiated beam is at most a certain predetermined intensity, the saturable absorber 2 absorbs this light and, when the intensity of an irradiated beam is at least the predetermined level, the absorption coefficient is reduced and the saturable absorber 2 transmits the light. A nonlinear optical transmission medium called a dispersion-type nonlinear optical transmission medium has its transmissivity increased when the intensity of an irradiated beam has become at least a predetermined value because the refractive index changes when the beam intensity has increased to that level. Usually a third-order nonlinear optical effect primarily contributes to these nonlinear optical transmission media.

FIG. 2 is a diagram for explaining the nonlinear optical transmission characteristics of the optical material for the information recording medium 98 shown in FIG. 1.

Referring to FIG. 2, there are two points of threshold values $I_{tha}$ and $I_{thb}$ of the nonlinear optical transmission characteristics. When information is to be reproduced at the time when the light of low intensity is irradiated on the disk, at the threshold value $I_{tha}$, an effective spot distribution 22 at the time of the reproduction is obtained, of which the spot diameter is effectively smaller than that of an incident beam spot distribution 21 at the time of the reproduction which is incident into a layer made of a nonlinear optical transmission medium such as the saturable absorber 2 (hereinafter to be referred to as a nonlinear optical transmission layer). When information is to be recorded at the time when the light of high intensity is irradiated, at the threshold value $I_{thb}$, an effective spot distribution 24 at the time of the recording can be obtained, of which the spot diameter is effectively smaller than that of an incident beam spot distribution 23 that enters the nonlinear optical transmission layer even at the time of recording.

With the provision of the nonlinear optical transmission layer made of a saturable absorber having such characteristics as described above, the information recording medium 98 can record a much smaller recording mark with the same wavelength and the same number of openings as those of the conventional information recording medium and can further read the recording mark in higher resolution.

In the manner as described above, the information recording medium 98 having the nonlinear optical transmission characteristics can have a smaller effective spot diameter also at the time of recording information, with the result that information can be recorded in high density.

The nonlinear optical transmission layer having these two threshold values is called an absorption-type layer. The saturable absorber 2 is provided, for example, by mixing two kinds of saturable absorbing pigments of different threshold values of the nonlinear optical transmission characteristics into solvents and forming the mixture in a layer shape by spin coating or the like on the information recording medium. In this case, the threshold values and the transmissivity are adjusted by matching the intensity of the beam at the time of reproducing and the intensity of the beam at the time of recording depending on the material and density of the organic pigment to be mixed, thickness of the layer, etc.

Figure 3A:
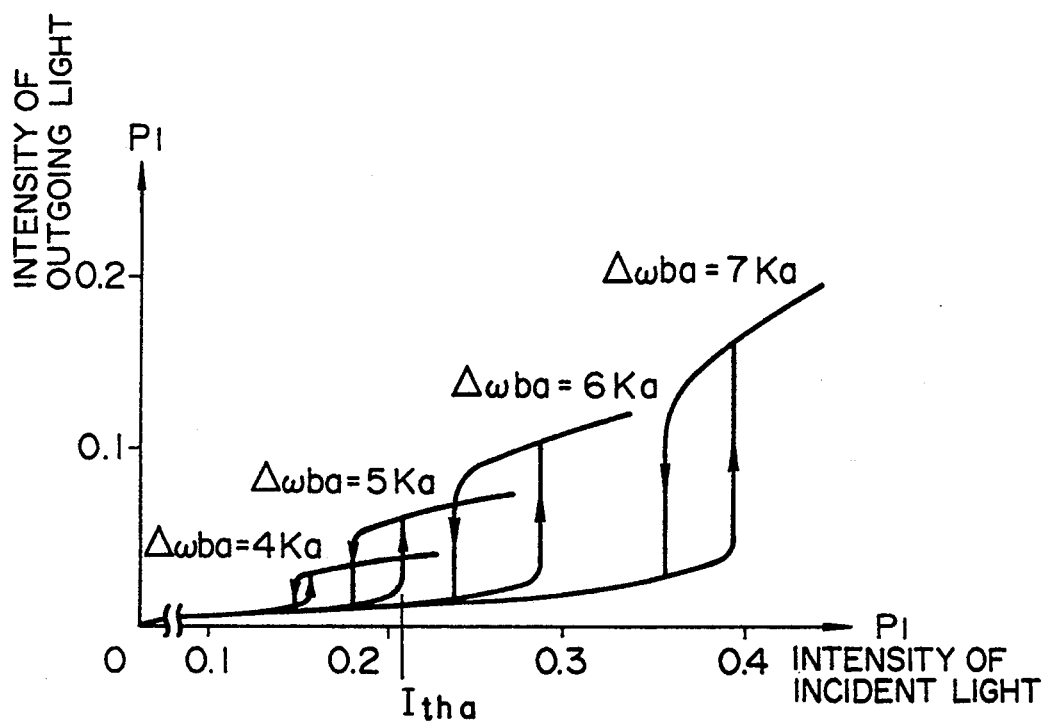
FIGS. 3A and 3B are graphs for showing an example of the nonlinear optical transmission characteristics of another optical material.
Figure 3B:
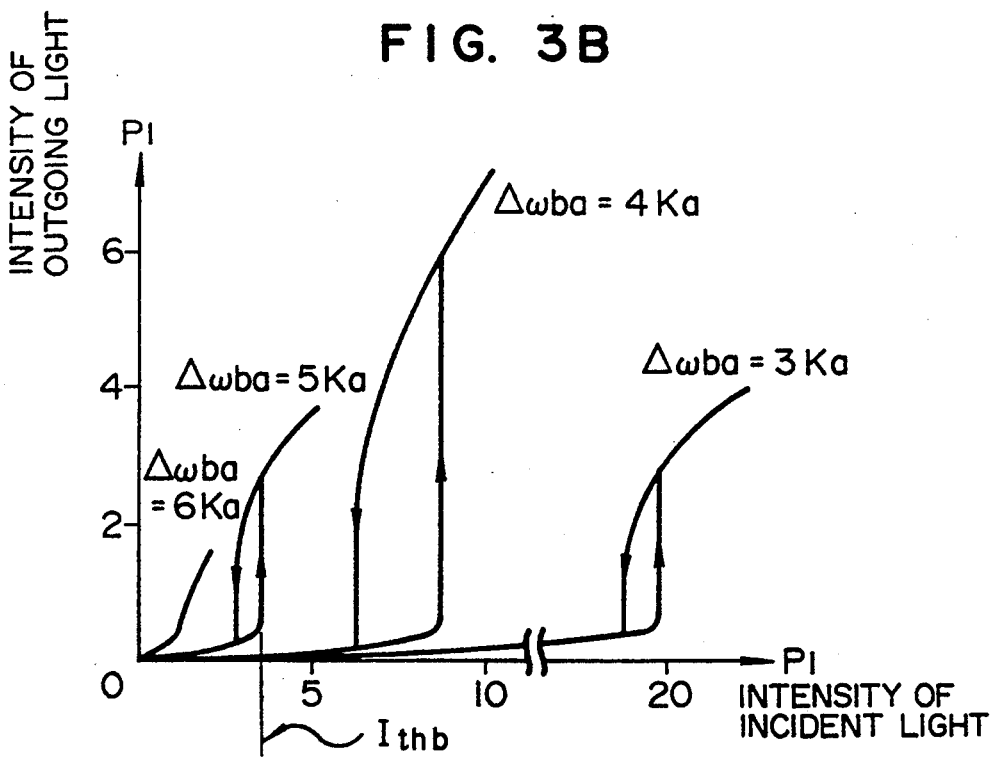

FIGS. 3A and 3B are diagrams for explaining another embodiment of the nonlinear optical transmission characteristics of the optical material for the information recording medium.

This embodiment shows the transmission characteristics of the dispersion-type nonlinear optical transmission layer which is obtained in a waveform of 389 nm in the structure of a resonator having a semiconductor crystal CuCl sandwiched between the dielectric reflection layers, as explained, for example, in "Physical Review Letters, Vol. 51" (1983) by N. Peyghambarian, et al, on pages 1692 to 1695.

According to these transmission characteristics, the transmissivity changes at a sharp threshold value as compared with the embodiment shown in FIG. 2 and further the transmissivity tends to reach saturation after the sharp increase because of the structure of the resonator, an embodiment of which will be explained later with reference to FIGS. 10 to 12.

FIG. 3A shows the characteristics of the case where the intensity of the incident beam is low, which corresponds to the exciton absorption process of the coherent semiconductor crystal CuCl. FIG. 3B shows the characteristics of the case where the intensity of the incident beam is high due to the exciton absorption of the incoherent semiconductor crystal CuCl. A hysteresis is observed in the characteristics but this can be controlled by adjusting the optical path length.

Figure 4:
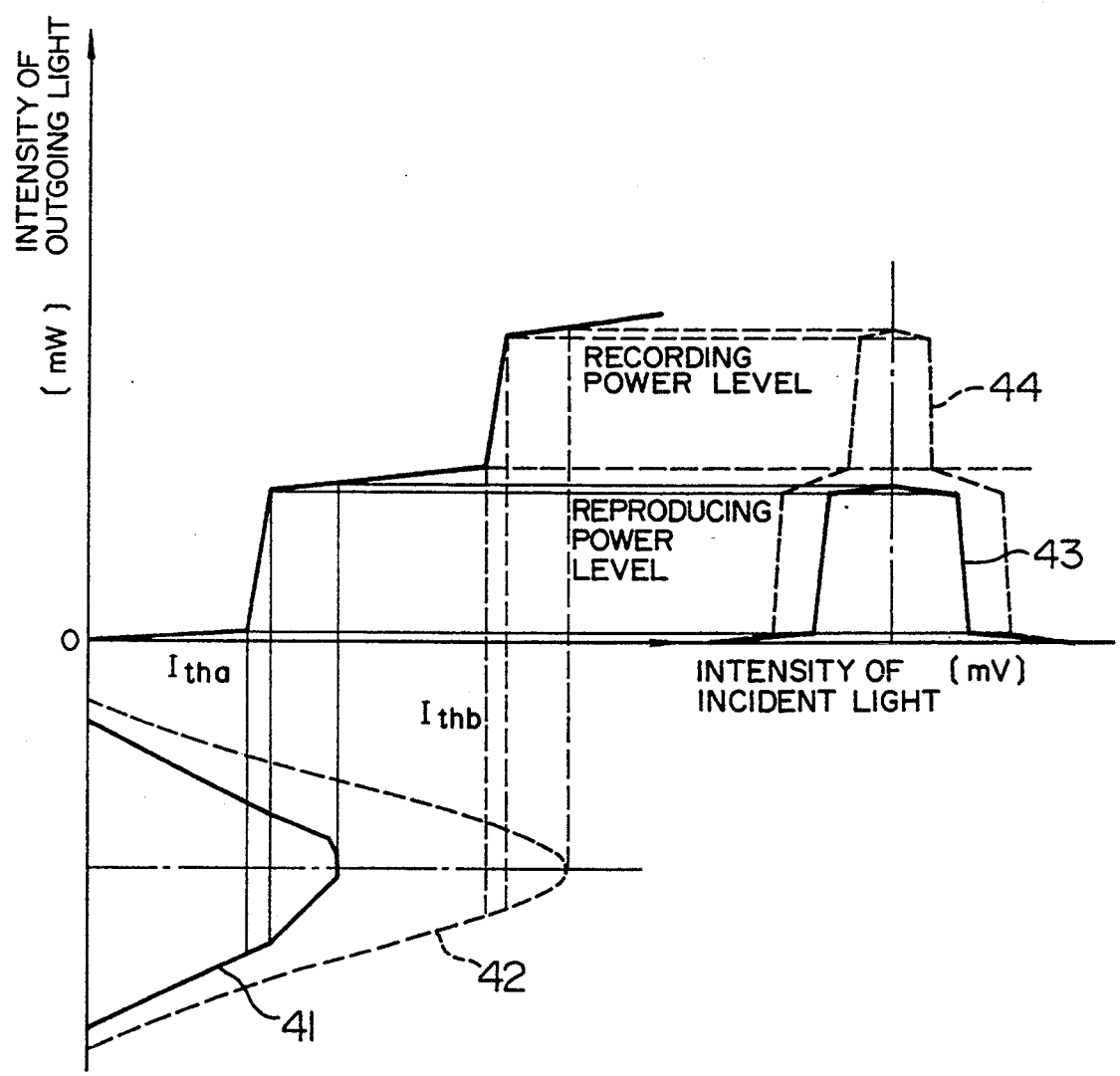
FIG. 4 is a graph for showing effective optical spot distribution characteristics of the optical material having the nonlinear optical transmission characteristics shown in FIGS. 3A and 3B.

FIG. 4 is a diagram for explaining the effective optical spot distribution characteristics of the optical material having the nonlinear optical transmission characteristics shown in FIGS. 3A and 3B.

FIG. 4 shows the nonlinear optical transmission characteristics of the optical material having a resonance structure, which has two threshold values of $I_{tha}$ and $I_{thb}$.

When the optical material having the nonlinear optical transmission characteristics shown in FIG. 4 is used, the effective spot diameter can be made smaller than an incident beam spot distribution 41 at the time of the reproduction and an incident beam optical spot distribution 42 at the time of recording, and further an effective spot distribution 43 at the time of the reproduction and an effective spot distribution 44 at the time of the recording can have ideal flat intensity distributions which are different from the Gaussian distribution.

The reproducing operation will be explained for the case where the signal detection is obtained from variation of a reflected light intensity characteristic, referring to FIGS. 1 and 4. In this case, the effective spot distribution 43 obtained through the saturable absorber 2 is irradiated on the information recording layer 1 on which a mark 5n having another reflectance corresponding to the presence or absence of data is formed, so that the obtained reflected light intensity corresponds to the effective spot distribution D′ shown in FIG. 1 or 43 in FIG. 4. That is, the reflected light intensity to the incident light intensity shows that both the threshold values $I_{tha}$ and $I_{thb}$ are sharp as shown in FIG. 4 since the incident light is passed twice through the saturable absorber 2. As a result, the resolving power is also enhanced in the reflected light detection system.

Regarding the optical material made of the absorption-type nonlinear optical transmission layer as explained based on FIGS. 1 and 2, problems that will arise at the time of recording or reproducing information when this optical material is used and an embodiment for solving these problems are explained below.

Figure 5A:
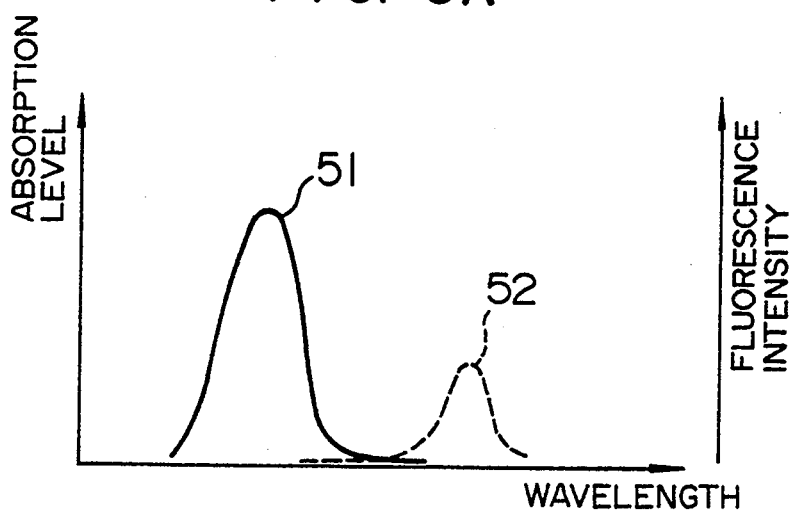
FIGS. 5A and 5B are graphs for showing characteristics of fluorescence generated from the absorption-type nonlinear optical transmission layer and characteristics of the waveform filter for shielding this fluorescence.
Figure 5B:
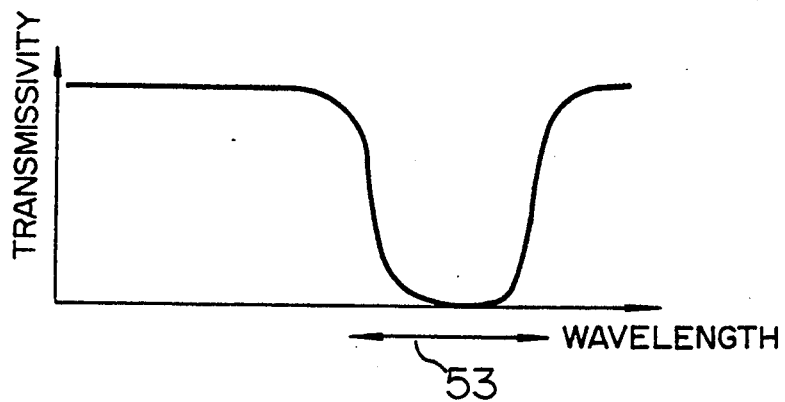

FIGS. 5A and 5B are explanatory diagrams for showing characteristics of a fluorescence which occurs in the absorption-type nonlinear optical transmission layer and characteristics of a waveform filter for shielding the fluorescence.

In general, as shown in FIG. 5A, the saturable absorber 2 generates a fluorescence peak 52 at a relatively longer waveform side than the waveform of the absorption peak when the state returns from the excitation state to the normal state by the light absorption for an absorption peak 51. When fluorescence has occurred, at the time of the reproduction, this fluorescence leaks into the photodetector for receiving light reflected from the recording mark on the disk and the fluorescence becomes a noise component. Further, when there is an absorption of the waveform of the fluorescence in the information recording layer, there is a risk of thermally breaking the data.

In order to eliminate the above-described problems, waveform filter characteristics which do not transmit a waveform band 53 that generates fluorescence are used, as shown in FIG. 5B. These waveform filter characteristics can similarly cut radiation beams other than fluorescence, such as, for example, phosphorescence and Raman scattering, and higher harmonic light energy including SHG (Second Harmonic Generation) and THG (Triple Harmonic Generation).

Figure 6:
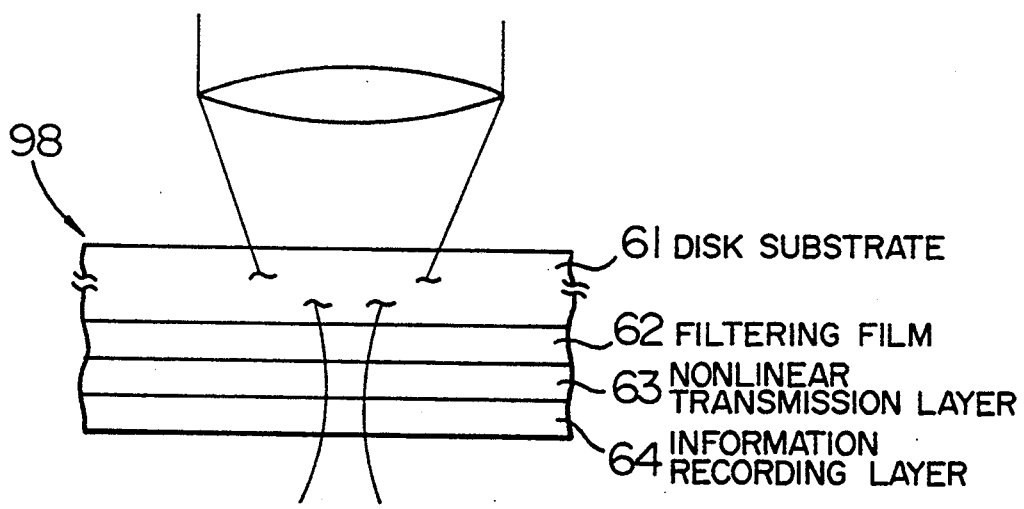
FIG. 6 is a cross sectional diagram for showing another example of the information recording medium according to the present invention.

FIG. 6 is a side cross sectional diagram for showing an embodiment of the structure of the information recording medium 98 which has a waveform filter for shielding the fluorescence in the embodiment shown in FIGS. 5A and 5B.

A waveform filter layer 62 having the characteristics shown in FIG. 5B is provided between a nonlinear optical transmission layer 63 and a disk substrate 61 on an information recording layer 64 to thereby prevent the fluorescence from returning to the optical detector from the nonlinear optical transmission layer 63.

Figure 7:
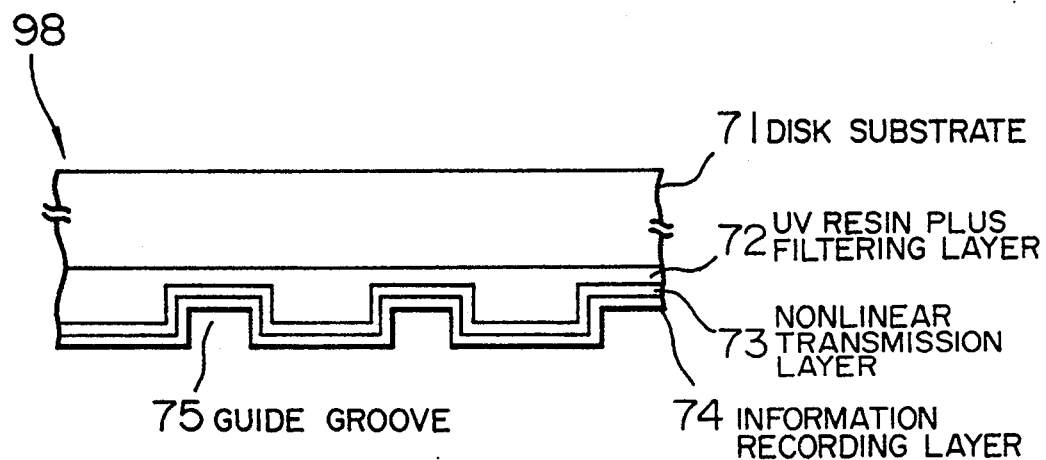
FIG. 7 is a cross sectional diagram for showing still another example of the information recording medium according to the present invention.

FIG. 7 is a side cross sectional diagram for showing still another embodiment of the structure of the information recording medium 98 which has the waveform filter for shielding the fluorescence in the characteristics shown in FIGS. 5A and 5B.

An information recording layer 74 and a nonlinear optical transmission layer 73 form guide grooves (tracks) 75 and others, and when an ultraviolet rays hardening resin (UV resin) layer 72 exists on the disk substrate 71, pigments or the like having the characteristics shown in FIG. 5B are mixed into this ultraviolet rays hardening resin to prevent the fluorescence from returning to the photodetector.

Figure 8:
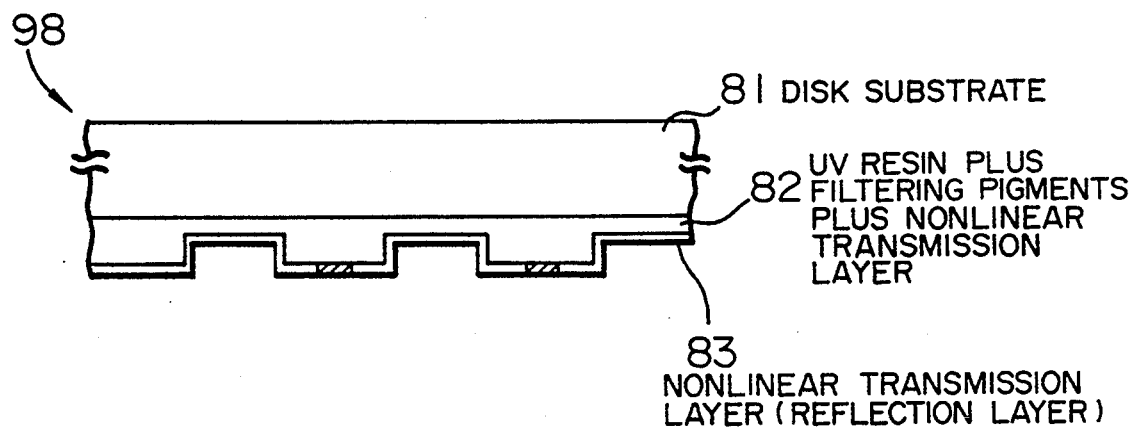
FIG. 8 is a cross sectional diagram for showing still another example of the information recording medium according to the present invention.

FIG. 8 is a side cross sectional diagram for showing still another embodiment of the structure of the information recording medium 98 which has the waveform filter for shielding the fluorescence in the characteristics in FIGS. 5A and 5B.

In order to prevent the fluorescence from returning to the photodetector, pigments having the characteristics shown in FIG. 5B and the saturable absorber 2 relating to the present invention have been mixed into an ultraviolet rays hardening resin (UV) layer 82 on a disk substrate 81. In this case, fluorescence is also prevented from entering an information recording layer 83. As an alternative, the information recording layer 83 may be selected to have no absorption of the fluorescent waveform band 53 shown in FIG. 5B.

Figure 9:
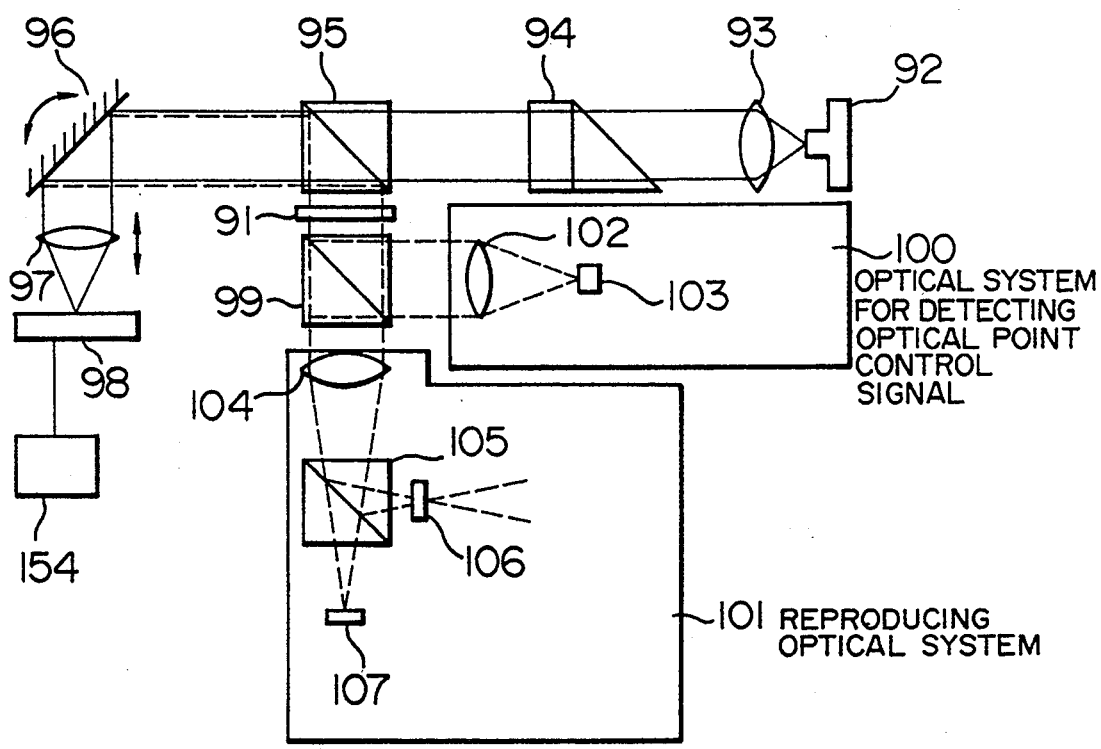
FIG. 9 is a configuration diagram for showing the information recording and reproducing unit according to the present invention.

FIG. 9 is a configuration diagram for showing an embodiment of the structure relating to the information recording and reproducing unit which uses the information recording medium of the present invention. The information recording and reproducing unit has a waveform filter 91 inserted into the optical path of the light receiving optical system within the optical head to prevent the fluorescence from returning to a photodetector from the information recording medium 98 of the present invention.

Light radiated from a laser light source 92 becomes a parallel luminous flux with a coupling lens 93 and this luminous flux is passed through a beam shaping prism 94, a polarized beam splitter 95, a galvanomirror 96 and an objective lens 97 structuring a focussing lens system. The parallel luminous flux is then focussed into the information recording medium 98. A reflection beam from the information recording medium 98 is returned to the objective lens 97 and the galvanomirror 96 and is reflected by the polarized beam splitter 95. The light is then passed through the waveform filter 91 and is guided to an optical point control signal detecting optical system 100 and a reproduction optical system 101. The optical point control signal detecting optical system 100 comprises a condenser lens 102 and a photodetector 103 to detect optical point control signals such as an out-of-focus signal and a track deviation signal. The astigmatism method as known can be used for detection of the focal error, and the known push-pull method can be used for detection of the tracking error. In addition, a magnetic layer is formed on the information recording medium, the easy magnetization axes of which are formed not only perpendicular to the plane of the magnetic layer but parallel to the plane at every track or sector. By detecting the direction of the easy magnetization axis, a position of recording information can be identified. The reproduction optical system 101 comprises a condenser lens 104, a half prism 105 and photodetectors 106 and 107 to reproduce address information and record information signal.

As described above, with the waveform filter 91 provided on the optical path, the fluorescence peak 52 from the saturable absorber 2 having the characteristics shown in FIG. 5A is prevented from entering the photodetectors 103, 106 and 107 to thereby avoid an erroneous detection due to the fluorescence peak generated by the saturable absorber 2.

While the resolution can be increased by applying the nonlinear optical medium to the optical recording and reproduction as explained with reference to FIGS. 1 to 4, the resolution can be best increased when the effective spot diameter is the smallest. In order to obtain the spot distribution having a small effective spot diameter, it is desirable that there is a large change in the transmissivity at the threshold value. Further, it is also desirable that the threshold value optical intensity is low from the viewpoint of the permissible value of the output of the semiconductor laser to be used as the light source.

If the hysteresis characteristics as shown in FIG. 3 exist, when the optical spot scans a recording mark train on the disk to detect a reproduced signal, the absorption becomes saturated and the spot diameter becomes effectively small in the proceeding direction of the spot, but the threshold value becomes apparently small at the rear side of the spot so that even the foot of the incident beam transmits the nonlinear optical transmission layer. As a result, even the spread of the foot of the spot is irradiated on the information recording layer. In order to solve this problem, it is necessary to eliminate the hysteresis characteristics, and therefore, the nonlinear optical transmission layer is made in a resonator structure or a multiple thin film interference structure to be described below, to obtain a sharp change of transmissivity, as shown in FIG. 4.

Figure 10:
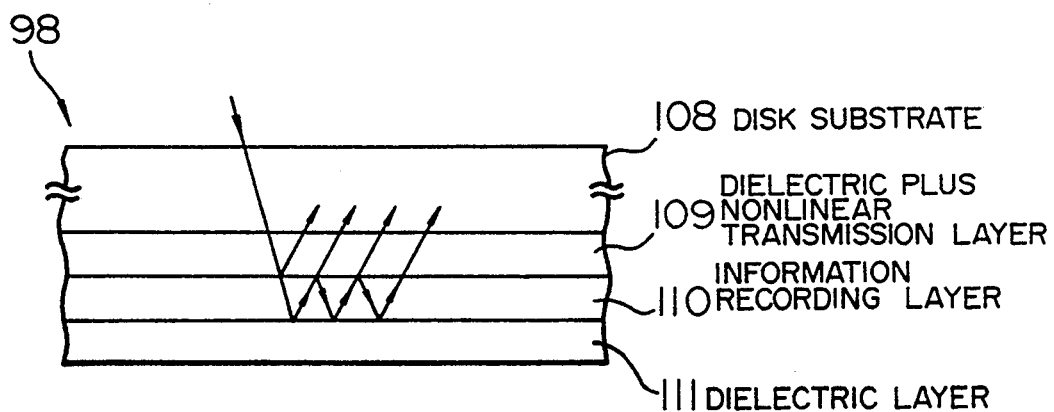
FIG. 10 is a cross sectional diagram for showing still another example of the information recording medium according to the present invention.

FIG. 10 is a side cross sectional diagram showing still another embodiment of the structure of the information recording medium 98 having a multiple interference structure.

The information recording medium 98 comprises a nonlinear optical transmission layer 109, an information recording layer 110 and a dielectric layer 111, with the information recording layer 110 made in a multiple interference structure. For the information recording layer 110, a medium of which reflectance changes based on presence or absence of a recording mark is used. A reflected light from the portion of the recording mark in the information recording layer 110 passes again the nonlinear optical transmission layer 109 so that the threshold value can be lowered.

Figure 11:
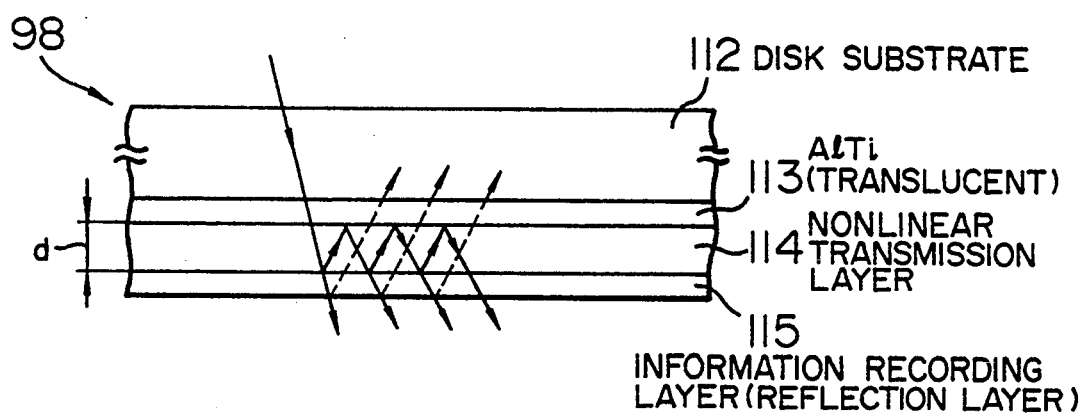
FIG. 11 is a cross sectional diagram for showing still another example of the information recording medium according to the present invention.

FIG. 11 is a side cross sectional diagram showing still another embodiment of the structure of the information recording medium 98 having an etalon in the nonlinear transmission layer.

The information recording medium 98 comprises a disk substrate 112, an AlTi layer 113, a nonlinear optical transmission layer 114 and an information recording layer 115, with the nonlinear optical transmission layer 114 sandwiched between the AlTi layer 113 and the information recording layer 115 to form the etalon.

A light incident to the nonlinear optical transmission layer 114 is reflected repeatedly within the nonlinear optical transmission layer 114 so that the light is intensified and thus the threshold value can be lowered significantly, by having such a structure which satisfies a relationship of $m\lambda = 2nd$, where d represents the film thickness of the nonlinear optical transmission layer 114 and n represents the refractive index.

Figure 12:
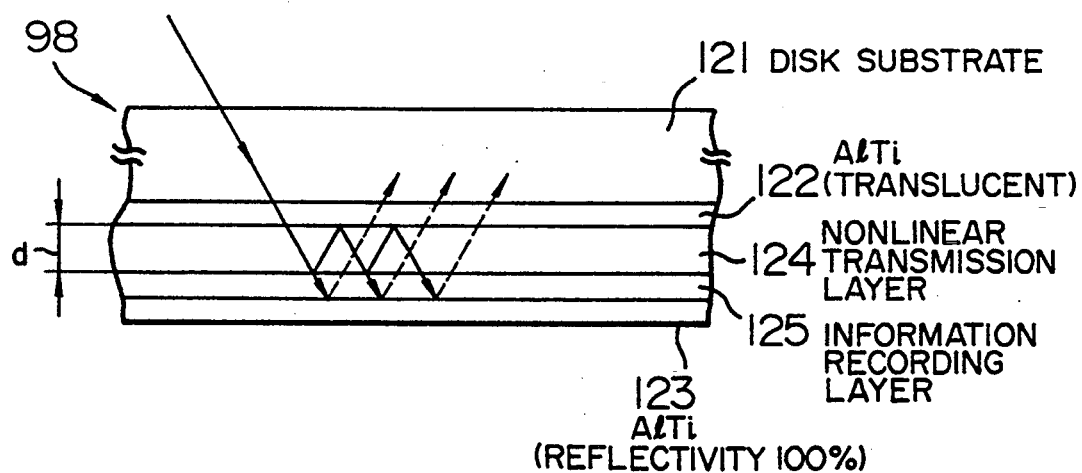
FIG. 12 is a cross sectional diagram for showing still another example of the information recording medium according to the present invention.

FIG. 12 is a side cross sectional diagram showing still another embodiment of the structure of the information recording medium 98 having a multiple etalon.

The information recording medium 98 comprises a disk substrate 121, AlTi layers 122 and 123, and an information recording layer 125, with the information recording layer 125 and the nonlinear optical transmission layer 124 sandwiched between the AlTi layers 122 and 123 to form the etalon. The AlTi layer 122 is translucent and the AlTi layer 123 has a reflectivity of 100%. Thus, a light which is reflected by the AlTi layer 123 increases the intensity of the reflected light within the nonlinear optical transmission layer 124 so that the threshold value can be lowered.

As explained above with reference to FIGS. 1 to 12, according to the information recording medium 98 and the information recording and reproducing unit, information is recorded and detected in only the areas in which the light intensity is at least predetermined different levels respectively within the focussed spot. With this arrangement, it becomes possible to record and reproduce fine information bits of at most the optical resolution so that the recording density of the optical disk can be improved substantially.

The present invention is not limited to the embodiments described above with reference to FIGS. 1 to 12. For example, although description has been made of the case of a write-once type optical disk unit in the present embodiment, the present invention can also be applied to the optical disk unit and the information recording and reproducing medium according to other systems such as the phase-change type optical disk unit, the optical magnetic disk unit, etc.

Next, a method for deciding a position at which information is to be recorded on the information recording medium 98 having a magnetic layer according to the present invention will be explained below. At first, the information recording medium 98 is rotated and a laser beam of 20 mW with a wave length of 550 nm is irradiated spirally onto the information recording medium 98. In this case, the laser beam is adjusted every rotation of the information recording medium 98 to control the temperature received by the information recording medium 98 depending on the perpendicular anisotropy. With this control, it becomes possible to form partial changes of magnetic characteristics. In other words, a portion having perpendicular magnetic anisotropy and a portion having no perpendicular magnetic anisotropy can be formed. This is the so-called first initializing. To be more specific, by this first initialization, it is possible to form tracks of which the easy magnetization axis is in a perpendicular direction and a parallel direction with respect to the plane of the information recording medium 98. It can be confirmed by an observation of a magnetic domain with a polarizing microscope whether the easy magnetization axis is the perpendicular anisotropy or not. With the above-described arrangement, as shown in the cross section of the information recording medium 98 in FIG. 13, tracks of the information recording medium 98 in the radial direction can be formed alternately in perpendicular magnetization portions 150 of which the easy magnetization axis is in a perpendicular direction and in-plane magnetization portions 151 of which easy magnetization axis is in a parallel direction.

Figure 13:
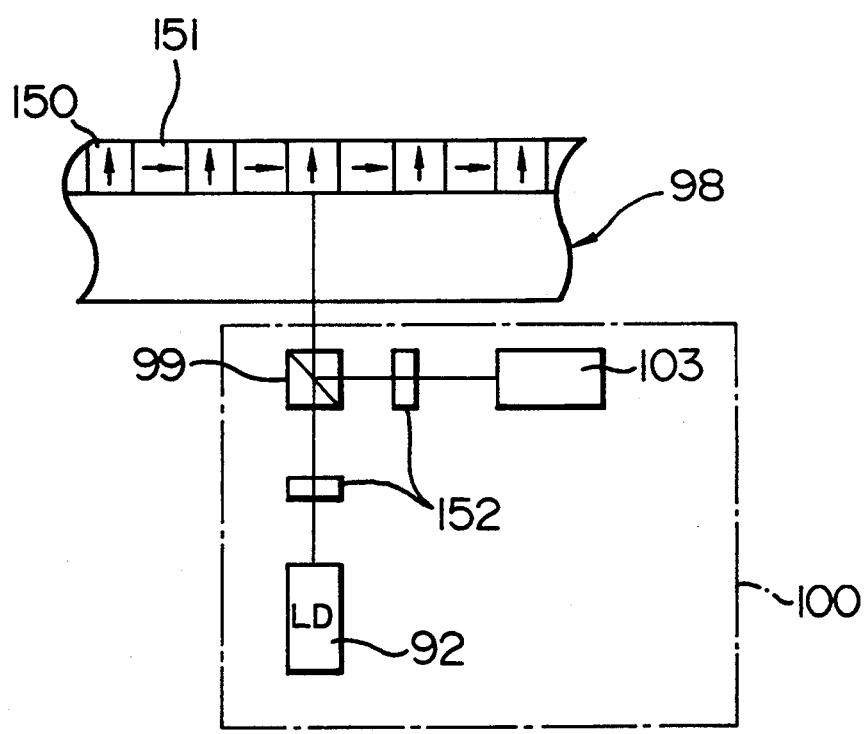
FIG. 13 is a diagram for explaining one method of deciding a position at which information is to be recorded according to the present invention.

The direction of the easy magnetization axis can be detected by the optical point control signal detecting optical system 100 which is structured by a semiconductor laser 92, a beam splitter 99 and a photodetector 103, as shown in FIG. 13. The optical system 100 in FIG. 13 is similar to that in FIG. 9. The photodetector 103 detects a difference between portions having the perpendicular magnetic anisotropy and portions having no perpendicular magnetic anisotropy for each track on the information recording medium 98. In other words, the photodetector 103 detects presence or absence of the Kerr effect or Faraday effect based on the tracks having the perpendicular magnetization portions 150 and the tracks having the in-plane magnetization portions 151. That is, irradiating the light on the perpendicular magnetization portions 150 causes the magneto-optical effect, or Kerr or Faraday effect, while the in-plane magnetization portion 151 does not cause the magneto-optical effect by irradiating the light.

It is easy, for example, to position such an optical head shown in FIG. 9 on a targeted track based on a detection signal by detecting the Kerr or Faraday effect generated by the perpendicular magnetization portion 150. The targeted track is not the in-plane magnetization portion 151 but the perpendicular magnetization portion 150. Since the track next to the targeted track of the perpendicular magnetization portion 150 is the in-plane magnetization portion 151, the selection of the targeted track is facilitated and thus the positioning of the optical head to the targeted track is made accurate. In other words, it becomes possible to position the optical head without deviating from the targeted track. By accurately positioning the optical head to the targeted track in the manner as described above, it becomes possible to correctly record control information such as addresses and the like on the targeted track. This is the so-called second initialization. Since the control information can also be recorded correctly, the optical head can also be positioned accurately to the data recording portion held by each sector without deviating from the targeted track, to thereby ensure a correct recording of data. With the accurate positioning of information to be recorded on the track, the information recording density can also be improved.

Figure 14:
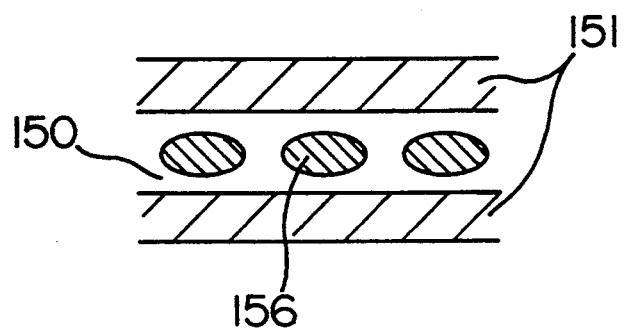
FIG. 14 is an enlarged plane diagram for showing the state of recording information on the information recording medium.

FIG. 14 is an explanatory diagram for showing that information has been recorded as a recording mark 156 at the perpendicular magnetization portion 150 of the information recording medium 98. Results of experiments show that there was no error in the information reproduced from recorded information based on the above-described method and no error occurred when the information was rewritten.

In the method for deciding a position of information to be recorded as explained based on FIG. 13, information is recorded at the perpendicular magnetization portion 150 of the information recording medium 98, but the information can also be recorded on both the perpendicular magnetization portion 150 and the in-plane magnetization portion 151. In this case, at first, the first initialization is carried out as explained based on FIG. 13 and then the portion of a perpendicular anisotropy generating the Kerr or Faraday effect out of the track, that is, the perpendicular magnetization portion 150, is detected with the photodetector 103 by using a laser beam in the manner as described above. Then, based on the detection information, a laser beam is applied to a targeted track to decide the position of the optical head. Thus the perpendicular magnetization portion 150 is second initialized. Then the information is recorded in the data recording portion of the sector as required. The second initialization and the data recording can also be carried out by using a laser beam and an externally applied magnetic field. Next, the portion where the Kerr or Faraday effect is not generated is detected with the photodetector 103 by using a laser beam. In other words, the in-plane magnetization portion 151 is detected. Then, based on the detection signal, a laser beam is applied to a targeted track to decide the position of the magnetic head, and the in-plane magnetization potion 151 is second-initialized. The information is then recorded on the data recording sector of the sector.

According to the experiments of the recorded information, the information recorded at the perpendicular magnetization portion 150 was reproduced by using a laser beam and the information recorded at the in-plane magnetization portion 151 was reproduced with the magnetic head, but both of the information were able to be reproduced without an error and no error occurred when the information was rewritten. As explained above, it is possible to improve the recording density of the information recording medium 98 by recording information at both the perpendicular magnetization portion 150 and the in-plane magnetization portion 151.

In the above description, both the case of recording information at only the perpendicular magnetization portion 150 and the case of recording information at both the perpendicular magnetization portion 150 and the in-plane magnetization portion 151 have been explained. However, it is also possible to record information at only the in-plane magnetization portion 151.

Although description has been made of the method for deciding the position of information for only the information recording medium 98 of the present invention, this method can also equally be effected for the information recording medium generally commercialized in the market.

In the above description, the first initialization has been carried out by irradiating a laser beam to the information recording medium 98 in a spiral shape, that is the tracks have been set in a spiral shape. However, the tracks may also be set concentrically. In this case, the irradiation of a laser beam may be intermittently carried out every rotation of the information recording medium 98.

Figure 15:
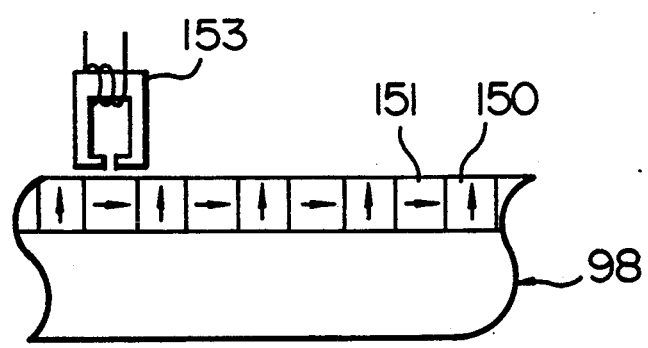
FIG. 15 is a diagram for explaining another method of deciding a position at which information is to be recorded according to the present invention.

FIG. 15 shows that a magnetic head 153 is used for deciding a position where information is recorded. The magnetic head 153 detects different electric signal levels between the perpendicular magnetization portion 150 and the in-plane magnetization portion 151, permitting a recording head to be properly positioned on a track.

What is claimed is:

1. An information recording medium for recording and reproducing information, comprising:
   an information recording layer for recording information by receiving light to be irradiated thereon; and
   an optical transmission restricting layer having a plurality of nonlinear transmission characteristics with respect to an intensity of said light to be irradiated, and having an optical material for restricting transmission of said light according to said nonlinear transmission characteristics when said light is irradiated onto said information recording layer.

2. An information recording medium according to claim 1, wherein said optical material is a combination of a plurality of optical media having said plurality of nonlinear transmission characteristics determined in predetermined threshold values with respect to said intensity of said light to be irradiated.

3. An information recording medium according to claim 2, wherein said optical material is formed by mixing into a binder a plurality of organic media having predetermined saturable absorption characteristics with respect to said light and a medium having the same characteristics as those of said organic media.

4. An information recording medium according to claim 1, wherein said optical transmission restricting layer further comprises an optical element layer for shielding light generated from said optical material.

5. An information recording medium for recording and reproducing information, comprising:
   an information recording layer for recording information by receiving light to be irradiated thereon; and
   an optical transmission restricting layer having a plurality of nonlinear reflection characteristics with respect to an intensity of said light to be irradiated, and having an optical material for restricting a quantity of light reflected from said information recording medium according to said intensity of said light to be irradiated.

6. An information recording medium according to claim 5, wherein said optical material is a combination of a plurality of optical media having said plurality of nonlinear reflection characteristics determined in predetermined threshold values with respect to said intensity of said light to be irradiated.

7. An information recording medium according to claim 6, wherein said optical material causes a coherent superposition between an incident wave of said light to be irradiated and a reflected wave thereof.

8. An information recording and reproducing unit for recording and reproducing information, comprising:
   a light source;
   an information recording medium including an information recording layer for recording information with light from said light source and an optical transmission restricting layer having a plurality of nonlinear transmission characteristics with respect to an intensity of said light, the optical transmission restricting layer further having an optical material for restricting transmission of said light according to said nonlinear transmission characteristics when said light is irradiated onto said information recording layer;
   optical means for focusing said light to be irradiated onto said information recording medium;
   reproduction optical means for reading information recorded in said information recording medium, by focusing said optical means according to said light restrictedly transmitted to said information recording medium; and
   information recording position setting means for setting a position at which information is to be recorded on said information recording means.

9. An information recording and reproducing unit for recording and reproducing information, comprising:
   a light source;
   an information recording medium including an information recording layer for recording information with light from said light source and an optical transmission restricting layer having a plurality of nonlinear transmission characteristics with respect to an intensity of said light, said optical transmission restricting layer further having an optical material for restricting transmission of said light to said information recording layer according to said nonlinear transmission characteristics when said light is irradiated onto said information recording layer;
   optical means for focusing said light to be irradiated onto said information recording medium;
   reproduction optical means for reading information recorded in said information recording medium, by focusing said optical means according to said light restricted to said information recording medium; and information recording position setting means for setting a position at which information is to be recorded on said information recording medium.

10. An information recording and reproducing unit according to claim 9, wherein said information recording medium includes an information recording layer for recording information by said irradiation of said light and an optical transmission restricting layer having a plurality of nonlinear reflection characteristics with respect to an intensity of said light, said optical transmission restricting layer having an optical material for restricting a quantity of light reflected from said information recording medium according to said intensity of said irradiated light.

11. An information recording and reproducing unit according to claim 9, further comprising an optical element material for shielding a radiation beam generated from said information recording medium, at a beam incident side of said reproduction optical means and said optical means.

12. An information recording and reproducing unit according to claim 9, wherein said information recording position setting means includes a photodetector for detecting an optical point deviation signal which shows a deviation of a predetermined information recording position at which information is to be reproduced on said information recording medium.

13. An information recording and reproducing unit according to claim 9, wherein said information recording position setting means includes first means for magnetizing an easy magnetization axis of tracks of said information recording medium in at least one of a perpendicular direction and a parallel direction with respect to a plane of said information recording medium, second means for detecting at least one of said perpendicular and parallel directions of said easy magnetization axes on said tracks of said information recording medium, and third means for recording information in a track having said at least one of said perpendicular and parallel directions of said easy magnetization axis that has been detected.

14. A method of deciding a position at which information is to be recorded on an information recording medium, comprising the steps of:
 a) initializing tracks of said information recording medium to obtain first and second types of tracks, the first type having an easy magnetization axis which is perpendicular to a plane of said information recording medium, and the second type having an easy magnetization axis which is parallel to the plane of said information recording medium;
 b) detecting one of the tracks initialized in step a);
 c) initializing the track detected in step b) to record control information in every sector of the detected track; and
 d) recording data at every data recording portion of each of said sectors of the detected track according to said control information.

15. A method of deciding a position at which information is to be recorded according to claim 14, wherein said detection of said direction of said easy magnetization axis in step b) is carried out by detecting the perpendicular magnetic anisotropy of said information recording medium.

16. A method of deciding a position at which information is to be recorded according to claim 14, wherein said recording of data in step d) is carried out by erasing information by irradiating a light at a portion of said information recording medium of which said easy magnetization axis is perpendicular with respect to the plane of said information recording medium, and then recording information by irradiating light at a portion of said information recording medium of which said easy magnetization axis is perpendicular to the plane of said information recording medium.

17. A method of deciding a position at which information is to be recorded according to claim 14, further comprising step e) of reproducing information according to the Kerr or Faraday effect at the time when light has been irradiated to said information at a portion of said information recording medium of which said easy magnetization axis is perpendicular with respect to the plane of said information recording medium.

18. A method of deciding a position at which information is to be recorded according to claim 14, wherein said detection of said direction of said easy magnetization axis in step b) is carried out based on presence or absence of the Kerr or Faraday effect in a border area between a first portion of said information recording medium of which said easy magnetization axis is perpendicular and a second portion of which said easy magnetization axis is parallel, respectively, with respect to the plane of said information recording medium at the time when light has been irradiated to said information recording medium.

19. A method of deciding a position at which information is to be recorded according to claim 14, wherein step a) is carried out by first irradiating light to all tracks of said information recording medium so that the respective easy magnetization axes of the tracks become perpendicular to the plane of said information recording medium, and then irradiating light to every other track so that the easy magnetization axes of said every other track become parallel to the plane of said information recording medium based on a change of magnetic characteristics of said information recording medium.

20. A method of deciding a position at which information is to be recorded according to claim 19, wherein when said easy magnetization axes of every other track are made parallel to the plane of said information recording medium, perpendicular magnetic anisotropic energy held by the tracks having said easy magnetization axes perpendicular to the plane of the information recording medium is changed to provide a change of the Kerr or Faraday effect.

21. An information recording and reproducing unit for recording and reproducing information, comprising:
 a light source;
 an information recording medium including an information recording layer for recording information by irradiation of a light from said light source, and an optical transmission restricting layer having a plurality of nonlinear reflection characteristics with respect to an intensity of said light, said optical transmission restricting layer further having an optical material for restricting a quantity of light reflected from said information recording medium according to said intensity of said irradiated light;
 optical means for focusing said light to be irradiated onto said information recording medium;
 reproduction optical means for reading information recorded in said information recording medium, by focusing said optical means according to said light restrictedly transmitted to said information recording medium; and
 information recording position setting means for setting a position at which information is to be recorded on said information recording medium.

* * * * *